US006757160B2

(12) United States Patent
Moore et al.

(10) Patent No.: US 6,757,160 B2
(45) Date of Patent: Jun. 29, 2004

(54) FLEXIBLE DOOR FOR USE WITH AN ELECTRONIC DEVICE

(75) Inventors: Earl W. Moore, Cypress, TX (US); Kevin L. Massaro, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 12 days.

(21) Appl. No.: 10/164,936

(22) Filed: Jun. 6, 2002

(65) Prior Publication Data

US 2003/0227741 A1 Dec. 11, 2003

(51) Int. Cl.[7] .................................................. G06F 1/16

(52) U.S. Cl. ...................................................... 361/683

(58) Field of Search ................................ 361/267–686, 361/724–727; 292/202, 203, DIG. 17, DIG. 63; 312/223.1, 223.2

(56) References Cited

U.S. PATENT DOCUMENTS 5,574,625 A * 11/1996 Ohgami et al. ............. 361/684
5,738,536 A * 4/1998 Ohgami et al. ............. 361/683
5,918,957 A * 7/1999 Bovio et al. ............. 312/223.2
6,002,581 A * 12/1999 Lindsey ...................... 361/680
6,266,240 B1 * 7/2001 Urban et al. ................ 361/686
6,421,235 B2 * 7/2002 Ditzik ........................ 361/683

* cited by examiner

*Primary Examiner*—Lisa Lea-Edmonds

(57) ABSTRACT

An electronic device having a flexible door attached to a housing. The flexible door comprises a plurality of panels coupled by sequential hinge members. The combination of hinge members with relatively stiffer door panels allows the door to conform to a variety of arcuate profiles while permitting substantial flattening of the door when opened.

29 Claims, 2 Drawing Sheets

42
22
26
10
18
34
44
36
44
4
24
28
32
38
12
38
40
4
16
36
36
14
30
20

42
10
22
26
18
34
44
36
44
4
24
32
28
38
38
40
12
16
4
36
36
14
30
20

52
54
14
50
52
48
3
56
46
3
56

FLEXIBLE DOOR FOR USE WITH AN ELECTRONIC DEVICE

FIELD OF THE INVENTION

The present invention relates generally to doors for selectively covering specific areas of a housing, and particularly to flexible doors that can conform to a curvilinear portion of a housing while permitting easy access to connectors or other components when the door is in an open position.

BACKGROUND OF THE INVENTION

In a variety of electronic devices, such as portable computers, doors are used to cover certain open regions of the housing. For example, in a portable computer, a variety of connectors and/or drives may be positioned along an edge of the device. When such components are not in use, either the connectors and/or drives remain exposed or some type of cover is deployed over the housing opening through which such items are accessed.

If the items remain exposed, they may be more susceptible to damage or wear. Additionally, the lack of a door can render the overall look of the device less aesthetically pleasing.

Conventional doors are pivotably mounted along the opening via pivots. For example, axles are sometimes molded into the door and retained in corresponding receptacles formed in the device housing. However, such axles are subject to wear and breakage.

Another problem with conventional doors is difficulty in application along, for instance, an edge of a device that has a substantial curve. For example, if a notebook computer or tablet PC has curved edges, it often is desirable to form a door with a corresponding curve to maintain the uniformity of the edge. However, when such a curved door is opened while the device is at rest upon a surface, the door cannot be sufficiently pivoted to provide non-interfering access to the items, e.g. connectors and/or drives, within the opening. In other words, during opening of the door, the curvature of the door can cause contact with the surface on which the device rests and block further pivoting movement of the door before it is fully displaced from the opening.

SUMMARY OF THE INVENTION

The present invention generally relates to a technique for covering openings in an electronic device housing. In some devices, a variety of items, such as connectors and/or drives must be accessible. The door of the present invention, however, allows openings containing such items to be closed when the items are not in use. The exemplary door is formed from a series of panels that are coupled to one another by hinge members. The hinge members allow conformation of the door to a desired curvature when closed while permitting substantial flattening of the door in an open position to facilitate access to the otherwise covered items.

BRIEF DESCRIPTION OF THE DRAWINGS

The invention will hereafter be described with reference to the accompanying drawings, wherein like reference numerals denote like elements, and.

DETAILED DESCRIPTION OF EXEMPLARY EMBODIMENTS

Figure 1:
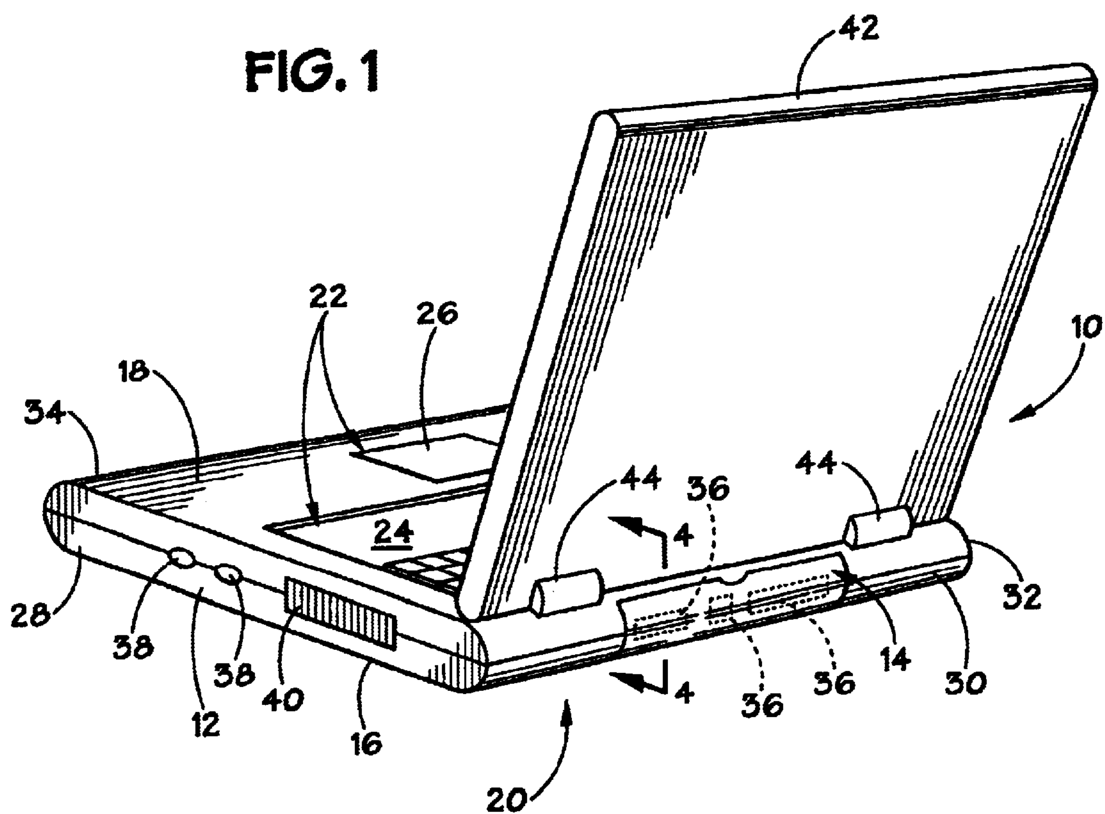
FIG. 1 is a perspective view of an exemplary electronic device having a door according to one embodiment of the present invention.

Referring generally to FIG. 1 an electronic device 10 having a device housing 12 and a door 14 is illustrated according to one embodiment of the present invention. The illustrated electronic device 10 may be a portable computer, such as a laptop or notebook computer, a personal digital assistant (PDA), a pocket PC, a tablet PC or a variety of other electronic devices. Thus, device housing 12 may have a variety of form factors depending on the type of device and its functionality.

Device housing 12 typically has a base surface 16 and a top surface 18. In some electronic devices 10, base surface 16 is designed to rest upon a support surface 20, such as a table top. Top surface 18, on the other hand, often is designed to accommodate various interface mechanisms 22, such as a keypad or keyboard 24 and a mouse pad 26.

Device housing 12 also has a variety of sides or edges 28, 30, 32 and 34. In the design illustrated, edges 28 and 32 are generally flat, and edges 30 and 34 are generally arcuate. Door 14 can be used at a variety of locations along device housing 12 including along curvilinear or arcuate regions, such as curved edges 30 and 34.

In the embodiment illustrated, one exemplary door 14 is shown mounted along curved edge 30. The flexibility of door 14 allows it to generally match the curvature of edge 30 while in the closed position, as illustrated in FIG. 1. However, this same flexibility allows door 14 to assume a generally flattened shape to permit access to one or more items 36 otherwise covered by door 14 when in the closed position. Depending on the design of electronic device 10, the types of items 36 enclosed by door 14 may vary. However, exemplary items 36 comprise connectors and/or drives. Device housing 12 also may accommodate other connectors, such as ports 38, and one or more drives 40.

In the specific embodiment illustrated, electronic device 10 also comprises a flip-up display 42. Display 42 is pivotably coupled to device housing 12 via one or more hinges 44. Such a display 42 may be utilized with an electronic device 10, such as a notebook computer.

Figure 2:
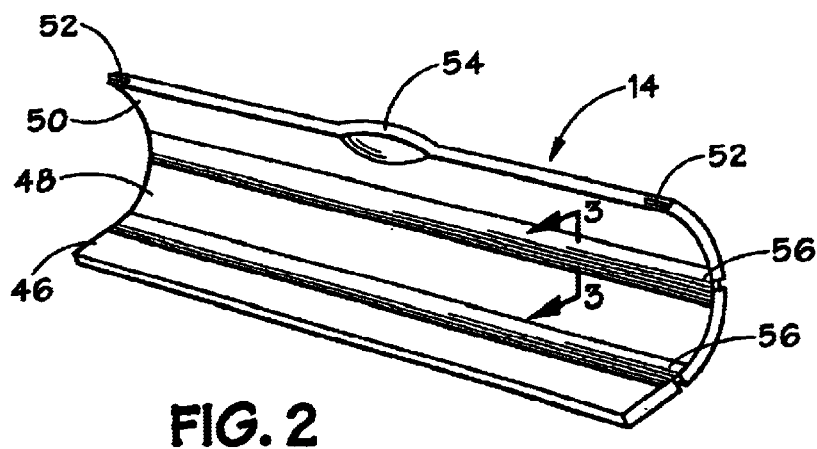
FIG. 2 is a perspective view of an electronic device door, according to one embodiment of the present invention.
Figure 3:
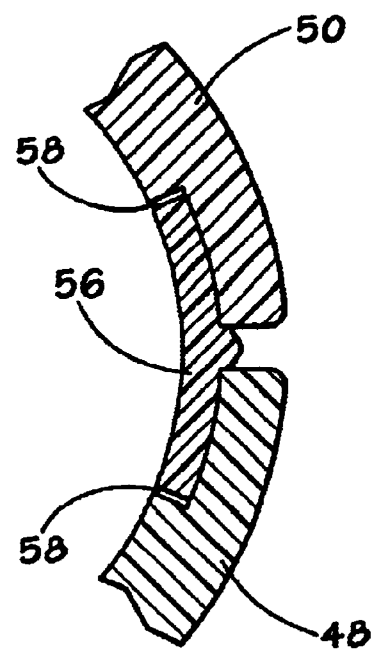
FIG. 3 is a cross-sectional view taken generally along line 3—3 of FIG. 2.

Referring generally to FIGS. 2 and 3, one exemplary flexible door 14 is illustrated. Door 14 comprises a plurality of relatively stiff elongate panels 46, 48, and 50. Although three panels are illustrated for purposes of explaining the invention, the actual number of stiff panels can vary depending on the size of the opening to be covered, size of the panels and desired ability of the door to conform. In the example illustrated, however, panel 46 is utilized as a connector panel by which door 14 is connected to device housing 12 (see FIG. 4). Panel 48 is an intermediate panel, and panel 50 is a distal panel relative to base panel 46.

Distal panel 50 may comprise one or more catches 52. Exemplary catches are in the form of slight protrusions or recesses designed to engage corresponding recesses or protrusions in housing 12, thereby securing door 14 in a closed position. Additionally, distal panel 50 may include a fixture 54 designed to facilitate opening of door 14 by permitting an individual to pull door 14 to an open position.

In the illustrated embodiment, panels 46, 48 and 50 are generally elongate panels. At least some of the panels, e.g.

panels 48 and 50, are arcuate in cross-section to help door 14 generally match the curvature of device housing 12 along edge 30. The cross-sectional shape of one or more of the panels can be adjusted from straight to a variety of curvilinear configurations to facilitate matching of the door contour to a given portion of a housing when the door is in its closed position. Panels 46, 48 and 50 are serially coupled by hinge members 56. Hinge members 56 permit panels 46, 48 and 50 to pivot with respect to each other, and this flexibility allows door 14 to flex between a contoured position, e.g. the closed position, and a generally flat configuration, e.g. the open position illustrated in FIG. 4.

Although hinge members 56 may be formed from a variety of hinge types, one exemplary type is a flexible hinge, as best illustrated in FIG. 3. In the specific embodiment illustrated, each hinge member 56 is an elongate flexible panel that flexibly couples adjacent stiff panels, such as panels 48 and 50 illustrated in FIG. 3. In the example illustrated, each panel comprises at least one recessed region 58. Recessed regions 58 generally lie adjacent one another when adjacent stiff panels are aligned. Each flexible hinge panel lies along the adjacent recessed regions 58 and is affixed to the respective panels, e.g. panel 48 and panel 50. The hinge members 56 may be coupled to the adjacent panels by adhesive, mechanical capture, co-molding or other suitable processes.

The materials utilized in the formation of panels 46, 48 and 50 as well as hinge members 56 may vary from one application to another depending on factors such as design and aesthetic configurations. However, exemplary materials for the stiff panels include the relatively stiff plastic materials utilized in a variety of computer and other device housings. Hinge members 56, on the other hand, are formed from material that is relatively more flexible than that of the stiff panels and may comprise a flexible rubber or plastic material.

Base panel 46 is attached to device housing 12 by, for example, screws, adhesive, heat stakes or other suitable attachment mechanisms. As illustrated best in FIG. 4, the exemplary device housing 12 has a relief area 60 sized to receive at least a portion of base panel 46. Generally, relief area 60 extends along an edge of a housing opening 66 formed to accommodate items 36 and to permit access to those items when door 14 is in the open position.

Figure 4:
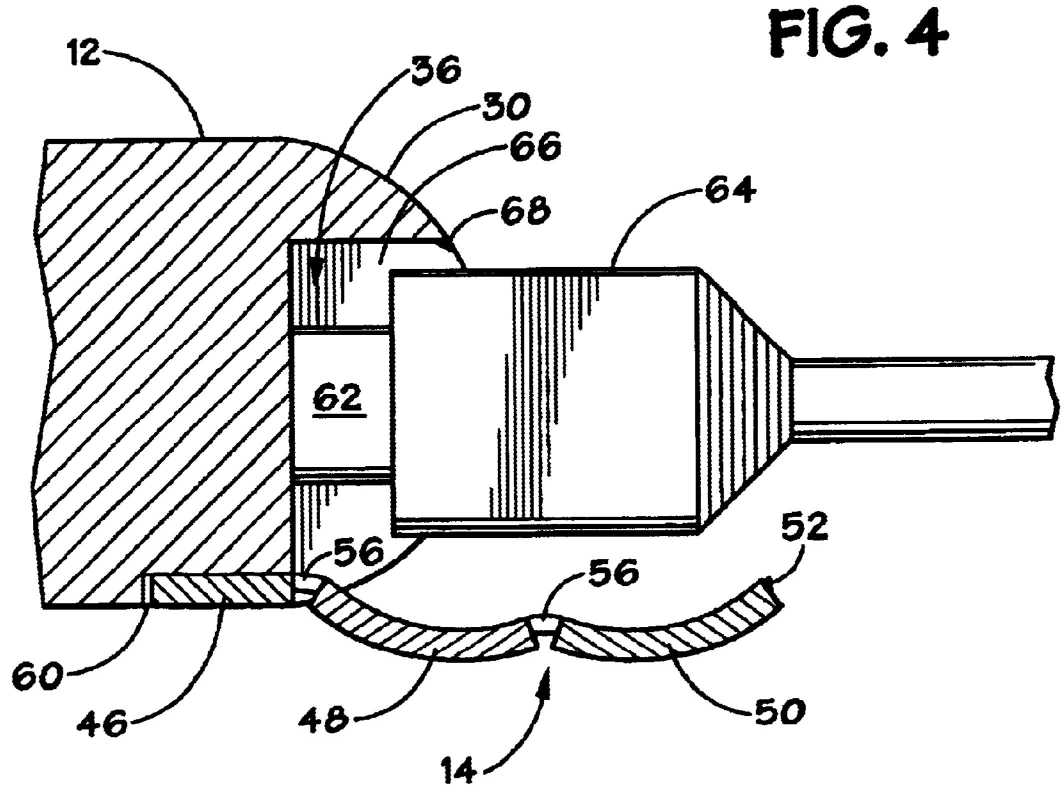
FIG. 4 is a cross-sectional view taken generally along line 4—4 of FIG. 1.

In FIG. 4, door 14 is illustrated in an generally flat, open position to permit engagement of one of the items 36, e.g. a connector 62, with a corresponding connector or device 64. When corresponding connector 64 is disconnected from connector 62, door 14 can be returned to its closed position, as illustrated in FIG. 1. In this position, door 14 covers item or items 36 (e.g. connector 62) and the surrounding opening 66 formed in device housing 12. One or more catches 52 engage a corresponding housing catch 68 disposed on device housing 12 to maintain door 14 in the closed position. The flexibility of hinge members 56 and the configuration of stiff panels 48 and 50 facilitate conformation of door 14 to the general curvature of housing edge 30.

In the embodiment illustrated, stiff panels 46, 48 and 50 as well as hinge panels 56 are arranged generally parallel with one another. In some designs, different door configurations may utilize stiff panels and hinge members of other configurations and orientations. Additionally, the illustrated hinge members 56 are disposed at specific, unique sequential distances from relief area 60. Those distances as well as the number of hinge members 56 may vary from one application to another. Additionally, with some types of hinge members 56, such as the illustrated flexible panels, one of the hinge members can be coupled to device housing 12 in lieu of or in combination with one of the stiffer panels.

It will be understood that the foregoing description is of exemplary embodiments of this invention, and that the invention is not limited to the specific forms shown. For example, the method may be applied to a wide variety of devices; the shape and size of the device housings as well as the flexible door may change from one application to another; the hinge and panel configuration can be adapted to a variety of applications; and the materials utilized may vary. These and other modifications may be made in the design and arrangement of the elements without departing from the scope of the invention as expressed in the appended claims.

What is claimed is:

1. An electronic device, comprising:

a housing having an opening; and a flexible cover positionable over the opening, the flexible cover having a plurality of stiff panels separated by at least one flexible member.

2. The electronic device as recited in claim 1, wherein at least one of the plurality of stiff panels is arcuate.

3. The electronic device as recited in claim 1, wherein the at least one flexible member comprises a pair of generally flexible members.

4. The electronic device as recited in claim 1, wherein the housing comprises a portable computer housing.

5. The electronic device as recited in claim 1, wherein the housing comprises a personal digital assistant housing.

6. The electronic device as recited in claim 1, wherein the housing comprises a tablet PC housing.

7. The electronic device as recited in claim 1, further comprising a connector disposed in the opening.

8. The electronic device as recited in claim 1, further comprising a drive disposed in the opening.

9. The electronic device as recited in claim 1, wherein the housing comprises an edge having the opening.

10. The electronic device as recited in claim 9, wherein the edge is generally arcuate and the flexible cover forms a corresponding are when in a closed position.

11. A device for covering an opening in a housing of an electronic device, comprising:

at least three elongate panels; and at least two hinge members disposed between the at least three elongate panels, wherein at least one of the at least three elongate panels is configured for attachment to the housing of the electronic device.

12. The device as recited in claim 11, wherein the at least two hinge members comprise flexible members.

13. The device as recited in claim 12, wherein the flexible members comprise elongate flex panels that are substantially more flexible than the at least three elongate panels.

14. The device as recited in claim 13, wherein the at least three elongate panels are formed of plastic.

15. A method for selectively covering an open area in a housing of an electronic device, comprising:

affixing an end of a door to the housing; and forming a plurality of flex joints in the door at unique distances from the end to permit conformation of the door into a generally arcutuate shape.

16. The method as recited in claim 15, wherein affixing comprises affixing the end of the door to a computer housing.

17. The method as recited in claim 15, wherein affixing comprises affixing the end of the door along an edge of a portable computer housing.

18. The method as recited in claim 15, wherein affixing comprises affixing the end of the door to a tablet PC housing.

19. The method as recited in claim 15, wherein affixing comprises affixing the end of the door to a PDA housing.

20. The method as recited in claim 15, wherein forming comprises connecting flexible panels between stiff panels.

21. The method as recited in claim 20, wherein connecting comprises connecting two flex panels between three stiff panels.

22. The method as recited in claim 20, wherein connecting comprises connecting two flex panels between three stiff panels.

23. The method as recited in claim 22, further comprising closing the door over the open area.

24. The method as recited in claim 23, wherein closing comprises holding the at least three panels along an arc.

25. The method as recited in claim 15, further comprising closing the door over the open area.

26. The method as recited in claim 25, further comprising latching the door at a latch end generally opposite the end of the door affixed to the housing.

27. A system for selectively covering an open area in a housing of an electronic device, comprising:

means for affixing an end of a door to the housing; and means for forming a plurality of flex joints in the door at unique distances from the end to permit conformation of the door into a generally arcuate shape.

28. The system as recited in claim 27, wherein the means for affixing comprises a stiff panel.

29. The system as recited in claim 27, wherein the means for forming comprises a plurality of flexible panels.

* * * * *